Aug. 17, 1965  R. N. DOBSON ETAL  3,200,769
RAILWAY TRUCK STRUCTURE AND MOTOR ATTACHMENT
Filed Jan. 10, 1962  3 Sheets-Sheet 2

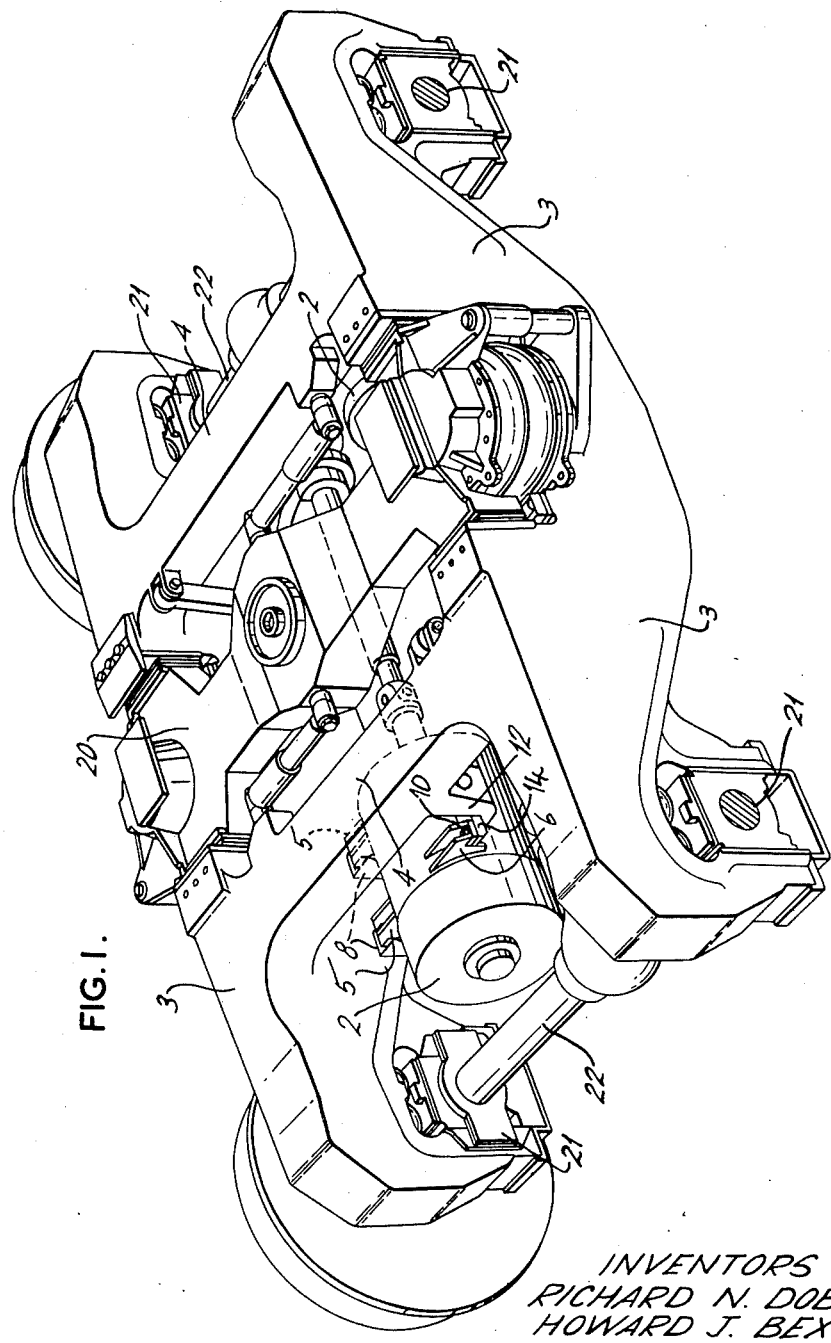

INVENTORS
RICHARD N. DOBSON
HOWARD J. BEXON
BY: Fetherstonhaugh & Co
ATTORNEYS

INVENTORS
RICHARD N. DOBSON
HOWARD J. BEXON
BY: Fetherstonhaugh & Co.
ATTORNEYS

United States Patent Office 3,200,769
Patented Aug. 17, 1965

3,200,769
RAILWAY TRUCK STRUCTURE AND MOTOR ATTACHMENT
Richard N. Dobson, Burlington, Ontario, and Howard J. Bexon, Oakville, Ontario, Canada, assignors to Dominion Foundries and Steel Limited, Hamilton, Ontario, Canada
Filed Jan. 10, 1962, Ser. No. 165,447
8 Claims. (Cl. 105—138)

This invention relates to the combination of a frame with a motor supported by the frame and especially, but not exclusively, to railway motor carrying truck frames of the type wherein electric motors are suspended from the frame and operatively connected to the truck axles by suitable drive shaft connections.

An object of the invention is to provide an arrangement wherein the suspended motors actually rest upon the frame structure rather than being supported by bolts depending from the frame as has been, in general, standard practice; the arrangement precluding any possibility of a motor dropping through bolt loosening or failure.

A further and particular object of the invention is to furnish the upper portion of each motor casing with two sets of mounts located upon either side of its upper central portion and which are supported by three pedestal brackets integral with the truck frame, one pair of mounts resting upon two brackets and the other pair of mounts resting upon a removable key bar supported by the third bracket; manual withdrawal of the bar permitting the motor to be readily lowered for repair or replacement.

The foregoing and other detail objects as shall appear from the following description are attained by the structure shown in the accompanying drawings, in which:

FIG. 1 is a perspective view of a complete railway truck frame.

Figure 4:
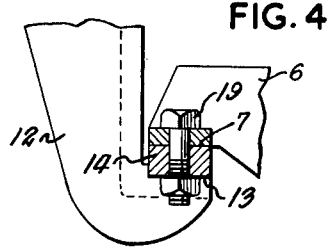
FIG. 4 is a similar view to FIG. 3, taken through the line 4—4, FIG. 2.
Figure 2:
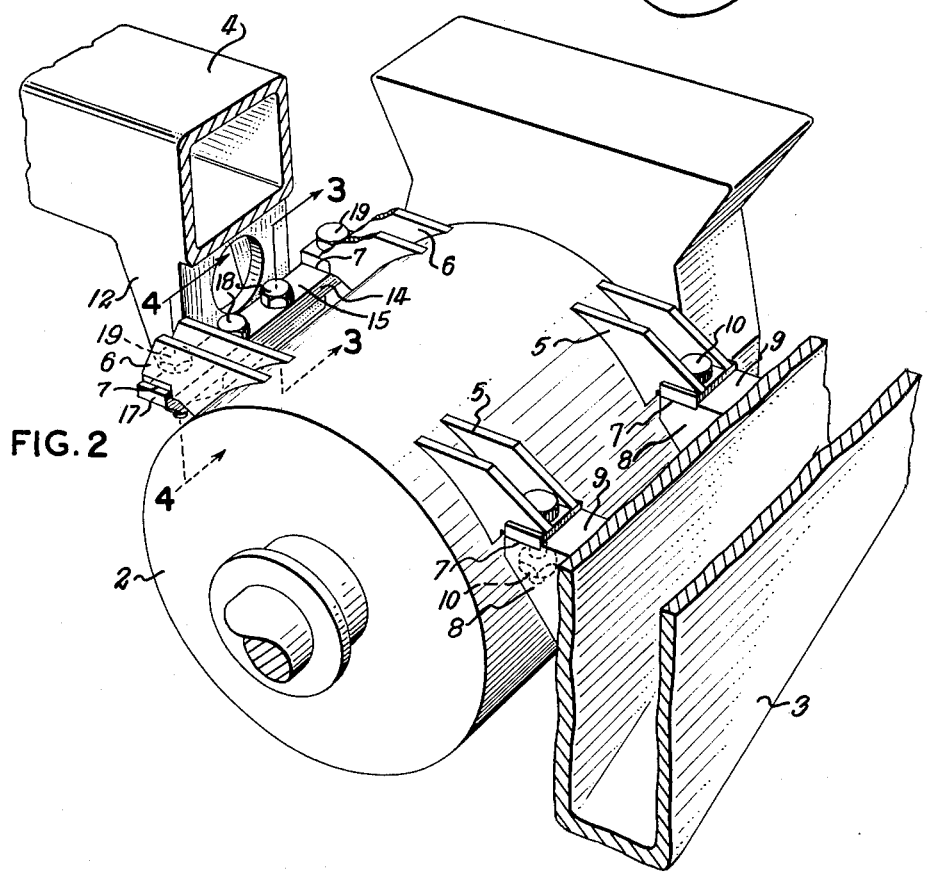
FIG. 2 is a fragmentary perspective view of a motor mounted upon a broken away portion of a truck side member and transom.
Figure 3:
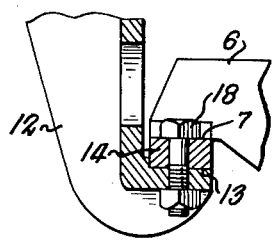
FIG. 3 is a fragmentary view of one of the motor mountings, taken through the line 3—3, FIG. 2.

A railway motor truck frame shown in FIG. 1 comprises a pair of spaced parallel frame side members 3, connected together intermediate their ends to form a unitary structure by two spaced parallel transoms 4, a bolster 20 being mounted between the side frames 3 by suitable means, which are not pertinent to the present invention and therefore are not particularly described. The ends of the frames 3 are provided with journal boxes 21, and an axle 22 carrying a respective pair of wheels 23 (only one wheel shown for clarity) is rotatably mounted by each immediately adjacent pair of journal boxes. An electric motor 2 is supported beneath each transom 4 and is connected to its associated axle 22 by suitable driving means, which also are not particularly described.

The motor 2 is of standard type and arrangement with the exception that the motor casing carries two pairs of mounts 5 and 6 protruding from the respective upper side portions of its casing. The mounts are all of similar U-shape bracket form and all have flat bottom faces 7, such faces of each pair being in the same horizontal plane.

For support of the side of the motor carrying the pair of mounts 5, a pair of support members 8 of the same spacing as the mounts 5 are formed upon the truck side member 3 to protrude inwardly from its inner face, the support members having flat top faces 9 upon which the bottom flat faces 7 of the mounts 5 rest. The mounts and support members are formed with aligned orifices for reception of securing bolts 10.

For support of the side of the motor carrying the pair of mounts 6, an L-shaped support member 12 is carried upon the bottom face of the transom 4 and formed with a horizontal flat top face 13. As will be seen upon reference to FIGS. 4–6, the support member 12 is positioned to pass freely between the motor mounts 6, being of less width than the distance between the mounts.

Support for the mounts 6 by the support member 12 is attained by provision of a removable key bar 14 having flat top and bottom faces 15 and 16, the key bar being of sufficient length to bridge the space between the mounts 6 and 2 underlie the flat bottom faces of the mounts 6, the bar being formed with upturned end lips 17 abutting the sides of the mounts to center the bar during assembly and to relieve shear stresses upon the assembly bolts. The center portion of the key bar rests upon the flat face of the support member 12 and is secured thereto by a pair of bolts 18 extending through aligned orifices in the member and bar. The bottom faces 7 of the mounts 6 rest upon the outer end portions of the top face 15 of the key bar, the mounts being secured thereto by bolts 19 extending through aligned orifices in the mounts and bar.

When positioning the motor in place, it is only necessary to lift the motor to a position wherein its mounts 5 rest upon the support members 8, and to obtain sufficient height clearance between the top face 13 of the support member 12 and the bottom faces 7 of the mounts 6 for insertion of the key bar to rest upon the face 13 of the member 12, and to have the faces 7 of the mounts 6 resting upon the bar, the bar thereby preventing movement of the member 12 through the space between the mounts 6. The six retaining bolts 10, 18 and 19 are then inserted in place and tightened to complete the assembly.

Figure 5:
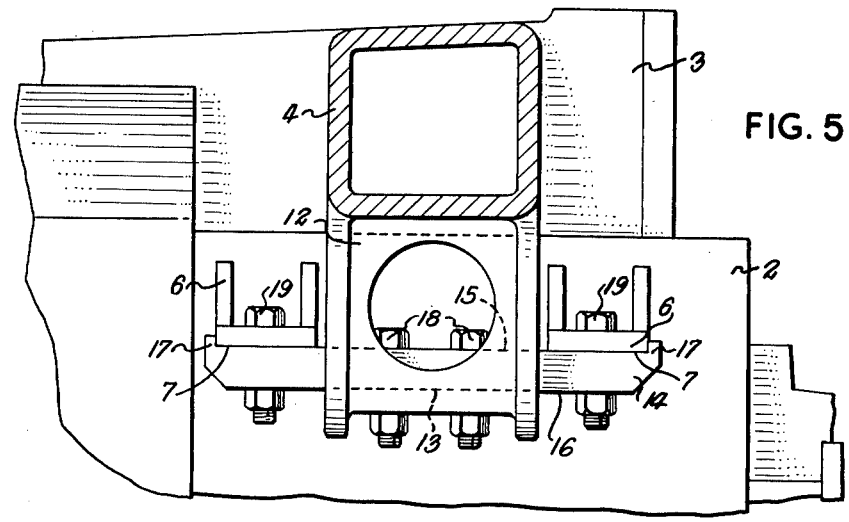
FIG. 5 is a fragmentary view of one side of the mounted motor and showing that side of the motor supported upon a removable key bar.
Figure 6:
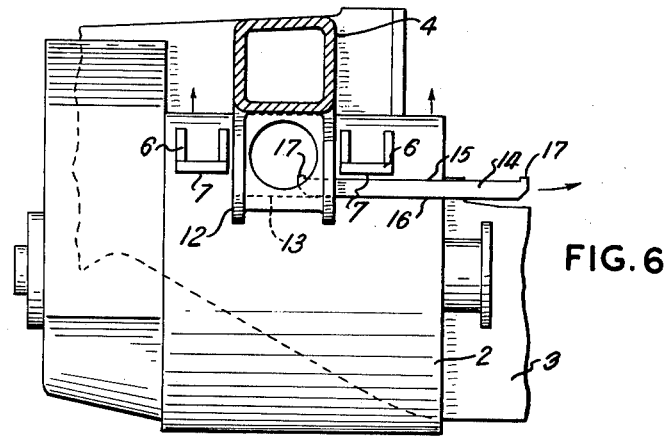
FIG. 6 is a reduced in size, similar view to FIG. 7 and showing the removing of the key bar.
Figure 7:
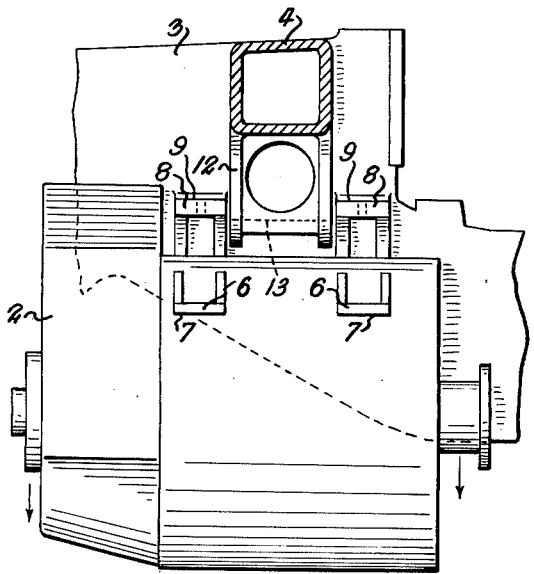
FIG. 7 is a similar view to FIG. 6 the key bar being completely removed and the motor disengaged and lowered from the frame.

To remove the motor, the bolts 10, 18 and 19 are withdrawn, and the motor slightly lifted to permit the key bar 14 to be withdrawn, as shown in FIG. 5, and thus allowing the motor to be swung off the support members 8 and dropped downwardly, as shown in FIG. 6.

The details of the structure herein disclosed may be substantially varied without departing from the spirit of the invention and the exclusive use of any such variations embraced by the scope of the appended claims.

What we claim as our invention is:

1. In combination with a frame comprising two spaced frame members, a motor disposed between the said frame members, mounting means mounting one side of the motor on its immediately adjacent frame member, and mounting means mounting the other side of the motor on the other frame member, at least one of said mounting means comprising a pair of spaced mounting members protruding from one of the respective side of the motor and the corresponding frame member, a cooperating mounting member protruding from the other of the said side of the motor and its corresponding frame member and movable freely through the space between the said spaced mounting members, a removable key bar disposed between the said spaced mounting members and the said cooperating mounting member and bridging the said space between the spaced mounting members to prevent movement of the cooperating mounting member therethrough, and means for securing together the said key bar and the associated mounting members.

2. The combination claimed in claim 1, wherein the said removable key bar is of such length that both its ends protrude beyond the said spaced mounting members and the said protruding ends are provided with end lips abutting the mounting members.

3. The combination with a railway truck frame comprising two spaced substantially parallel side frame members, at least one transom extending between said side frame members and a hanger frame member extending downwardly from said transom between the side frame members, of a motor disposed between one of the said side frame members and the said hanger frame member and beneath the transom, mounting means mounting one side of the motor on the last-mentioned side frame member, and mounting means mounting the other side of the motor on the said hanger frame member, at least one of said mounting means comprising a pair of spaced mounting members protruding from one of the respective side of the motor and the corresponding frame member, a cooperating mounting member protruding from the other of the said side of the motor and its corresponding frame member and movable freely through the space between the said spaced mounting members, a removable key bar disposed between the said spaced mounting members and the said cooperating mounting member and bridging the said space between the spaced mounting members to prevent movement of the cooperating mounting member therethrough, and means for securing together the said key bar and the associated mounting members.

4. In combination with a frame comprising two spaced frame members, a motor disposed between the said frame members, mounting means mounting one side of the motor on its adjacent frame member, and mounting means mounting the other side of the motor on the other frame member, at least one of said mounting means comprising a pair of spaced mounting members protruding from the respective side of the motor, a cooperating mounting member protruding from the corresponding frame member and movable freely through the space between the said spaced mounting members, a removable key bar disposed between the said spaced mounting members and the said cooperating mounting member and bridging the said space between the spaced mounting members to prevent movement of the cooperating mounting member therethrough, and means for securing together the said key bar and the associated mounting memebrs.

5. In combination with a frame comprising two spaced frame members, a motor disposed between the said frame members, first mounting means mounting one side of the motor on its immediately adjacent frame member comprising a pair of spaced frame mounting members protruding from the said frame member, a pair of corresponding spaced motor mounting members protruding from the respective side of the motor and each resting on a corresponding one of the first mentioned mounting members, and means for securing together each frame mounting member and its corresponding motor mounting member, and second mounting means mounting the other side of the motor on its immediately adjacent frame member comprising a pair of spaced motor mounting members protruding from the said other side of the motor, a cooperating mounting member protruding from the associated frame member and movable freely through the space between the spaced motor mounting members, a removable key bar disposed between the last-mentioned frame and motor mounting members, resting on the said frame mounting member, having the said motor mounting members resting thereon, and bridging the space between the said motor mounting members, and means for securing together the said key bar and the associated mounting members.

6. The combination claimed in claim 5, wherein the said frame is a railway truck frame comprising two spaced substantially parallel side frame members, at least one transom extending between the side frame members and a hanger frame member extending downwardly from said transom between the side frame members, wherein the motor is disposed between one of the side frame members and the hanger frame member and beneath the transom, and wherein one side of the motor is mounted on the side frame member by said first mounting means, and the other side of the motor is mounted on the hanger frame member by the said second mounting means.

7. In combination with a frame comprising two spaced frame members, a motor disposed between the said frame members, mounting means mounting one side of the motor on its immediately adjacent frame member, and mounting means mounting the other side of the motor on the other frame member, at least one of said mounting means comprising a pair of spaced mounting members protruding from one of the respective sides of the motor and the corresponding frame member, a cooperating member protruding from the other of the said side of the motor and its corresponding frame member and movable freely through the space between the said spaced mounting members, a removable key bar disposed between the said spaced mounting members and the said cooperating mounting member, resting on each mounting member protruding from the frame and having each mounting member protruding from the motor resting thereon, and bridging the said space between the spaced mounting members to prevent movement of the cooperating mounting member therethrough, and means for securing together the said key bar and the associated mounting members.

8. The combination claimed in claim 7, wherein the said frame is a railway truck frame comprising two spaced substantially parallel side frame members, at least one transom extending between the side frame members and a hanger frame member extending downwardly from said transom between the side frame members, wherein the motor is disposed between one of the side frame members and the hanger frame member and beneath the transom, and wherein one side of the motor is mounted on the side frame member by one mounting means, and the other side of the motor is mounted on the hanger frame member by the other mounting means.

References Cited by the Examiner

UNITED STATES PATENTS

| | | | |
|---|---|---|---|
| 1,831,714 | 11/31 | Latshaw | 105—133 |
| 1,962,893 | 6/34 | Christianson | 105—113 X |

MILTON BUCHLER, *Primary Examiner.*

JAMES S. SHANK, LEO QUACKENBUSH, *Examiners.*